W. W. GREEN, Jr.
MORTISING-MACHINES.

No. 194,869. Patented Sept. 4, 1877.

WITNESSES:
Chas. Nida
J. H. Scarborough

INVENTOR:
W. W. Green Jr
BY
ATTORNEYS.

UNITED STATES PATENT OFFICE.

WILLIAM W. GREEN, JR., OF CHICAGO, ILLINOIS, ASSIGNOR TO HIMSELF, E. N. NIEGELSEN, AND J. M. SHIELDS, OF SAME PLACE.

IMPROVEMENT IN MORTISING-MACHINES.

Specification forming part of Letters Patent No. 194,869, dated September 4, 1877; application filed February 26, 1877.

*To all whom it may concern:*

Figure 1:
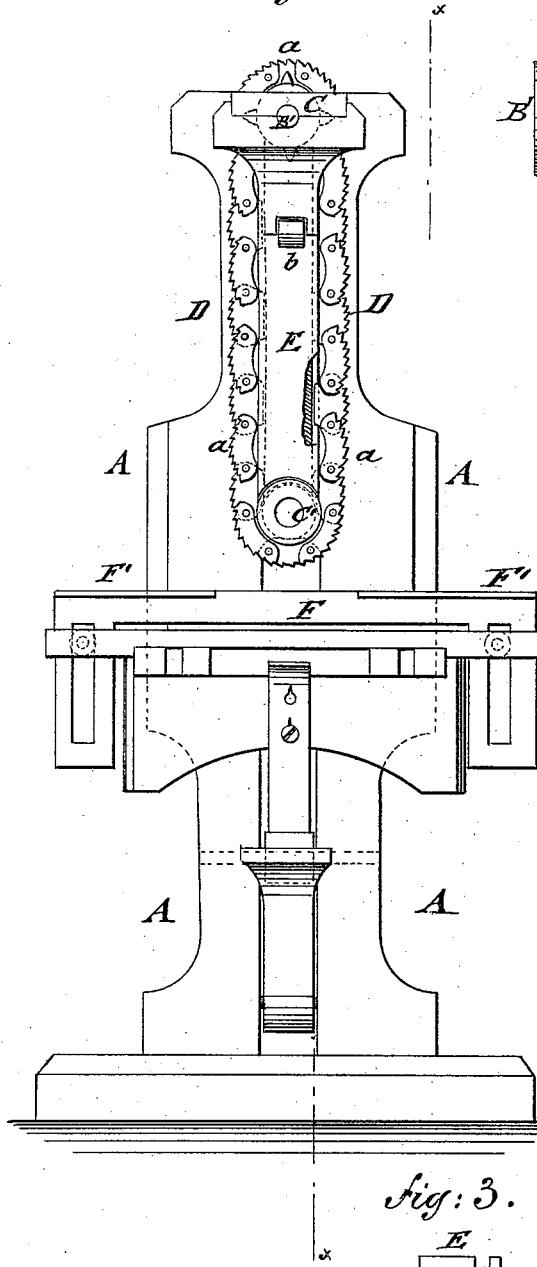
Figure 2:
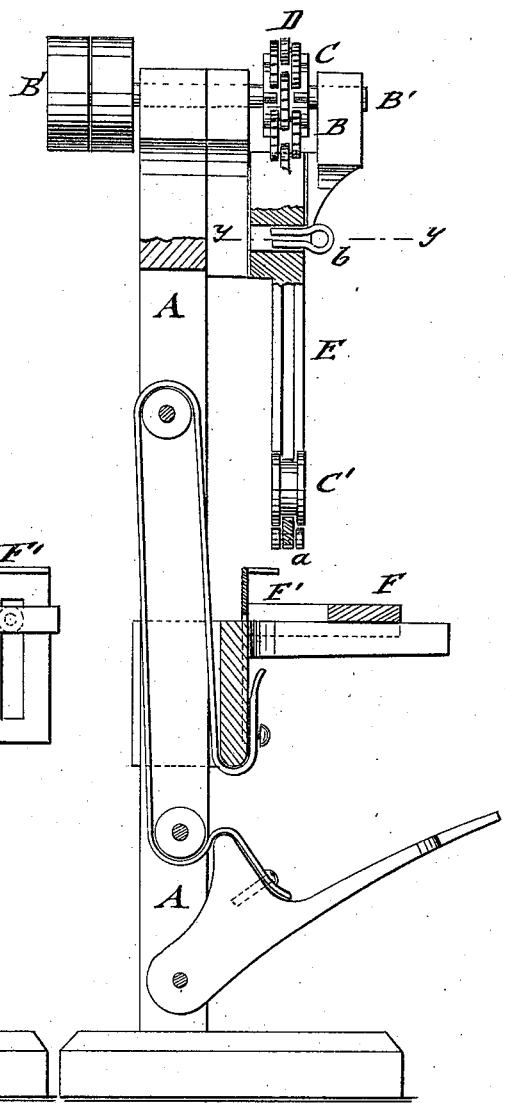
Figure 3:
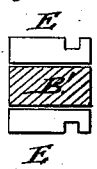

Be it known that I, WILLIAM W. GREEN, Jr., of Chicago, in the county of Cook and State of Illinois, have invented a new and Improved Mortising-Machine, of which the following is a specification:

In the accompanying drawings, Figure 1 represents a front elevation of my improved mortising-machine; Fig. 2, a vertical transverse section of the same on line $x\,x$, Fig. 1; and Fig. 3 a detail horizontal section of the tension-bar on line $y\,y$, Fig. 2.

Similar letters of reference indicate corresponding parts.

This invention has reference to a new construction of mortising-machine; and consists of a revolving endless-chain saw, formed of pivoted sections or links with cutting-teeth, to which the proper tension is imparted by a grooved tension-bar, the wood being fed and guided to the mortising-saw by a movable treadle-acted table or bench.

Referring to the drawings, A represents the upright standard of my improved mortising-machine, that is secured to a suitable base, and provided at the upper end with a projecting bracket, B, with bearings for the driving-shaft B'.

The driving-shaft B' is revolved in suitable manner, actuating, by a spurred pulley, C, an endless chain, D, that is formed of a number of segmental links, $a$, which are pivoted together, so that a single center-link alternates with two adjoining links.

In the drawing the shape of three adjoining links corresponds to a semicircle of the pulley C, so that the spurs of the same take hold of the outer double link, leaving an intermediate space for the passage of the single link, as shown in Fig. 1.

The links $a$ are formed with cutting-teeth in the nature of a saw, by which the mortise is cut out, in place of the clipping action of the revolving cutter.

The endless chain D is stretched over the spurred top wheel C, and a lower guide-roller, C', by a tension-bar, E, a set-screw at the upper part with a piece of rubber or a spring, $b$, keeping the chain tight while in use.

The sides of the tension-bar and the stretching-roller are longitudinally grooved to guide the single links $a$ of the chain that project by their lower straight parts into the inside of the guide-grooves.

The wood to be cut or mortised is fed to the endless chain by a vertically-movable table, F, that is guided along the standard A by a suitable belt and treadle, as shown in Fig. 2. The table F is arranged with vertically-adjustable guides F' having central recess for the passage of the chain, so as to act on the wood.

Any thickness of wood can thus be exposed to the action of the saw, while, by stretching a chain with wider links on the rollers, a mortise of greater width may be cut. By feeding the stuff along the table the mortise is cut by the chain-saw.

The machine may be employed for mortising, sawing, and recessing lumber, as it is readily controlled by the movable table and worked in rapid and effective manner.

To the sides of the tension-bar may be attached, by studs or pins, wedge-shaped sections, which impart to the endless cutting-chain a certain angle of inclination at both sides, and admit thereby the cutting of wedge-shaped mortises, when such are required.

Having thus described my invention, I claim as new and desire to secure by Letters Patent—

The combination, with a chain-saw, D, and a movable table, F, of a tension-bar, E, provided with spring at top to keep the chain taut, and a groove to correspond with that in top and bottom wheels, as and for the purpose specified.

WILLIAM W. GREEN, JR.

Witnesses:
JOHN H. MASON,
PETER RAY.